United States Patent [19]

Harder, Jr.

[11] 3,848,925

[45] Nov. 19, 1974

[54] TRANSIT VEHICLE SEAT

[75] Inventor: Arthur J. Harder, Jr., Franklin Park, Ill.

[73] Assignee: Coach and Car Equipment Corporation, Elk Grove Village, Ill.

[22] Filed: Nov. 2, 1972

[21] Appl. No.: 303,243

[52] U.S. Cl......... 297/452, 297/DIG. 1, 297/DIG. 2
[51] Int. Cl............................................. A47c 7/02
[58] Field of Search ........... 297/440, 443, 444, 452, 297/460, DIG. 1, DIG. 2; 264/135, 45

[56] References Cited
UNITED STATES PATENTS

| | | | |
|---|---|---|---|
| 2,284,957 | 6/1942 | Gedris................. | 297/444 |
| 2,960,152 | 11/1960 | Wendell.................. | 297/DIG. 1 |
| 3,123,403 | 3/1964 | Hood..................... | 297/452 X |
| 3,277,220 | 10/1966 | Plymale.................. | 264/45 |
| 3,283,386 | 11/1966 | Cenegy................... | 264/45 X |
| 3,288,529 | 11/1966 | Koch..................... | 297/444 X |
| 3,352,955 | 11/1967 | Pigott et al............. | 264/135 |
| 3,455,483 | 7/1969 | Inklaar................... | 264/45 X |
| 3,505,137 | 4/1970 | Kliene................... | 264/45 X |
| 3,563,184 | 2/1971 | Angelbeck................ | 108/51 |
| 3,736,022 | 5/1973 | Radke.................... | 297/DIG. 1 X |

OTHER PUBLICATIONS

Mobay Chemical Company Product Application Bulletin, "Jetliner Lounge Seats," 4 pp. 1-4, October 1960.

Primary Examiner—Paul R. Gilliam
Assistant Examiner—William E. Lyddane
Attorney, Agent, or Firm—Merriam, Marshall, Shapiro & Klose

[57] ABSTRACT

A transit seat comprising a monolithic, hollow plastic shell rotary cast into an aesthetically pleasing curved configuration and a foamed plastic material completely filling the interior of the shell to impart improved mechanical properties to the seat compared to those provided by the shell, alone. The seat has cushion sections which are readily removable yet not readily susceptible to pilferage.

3 Claims, 12 Drawing Figures

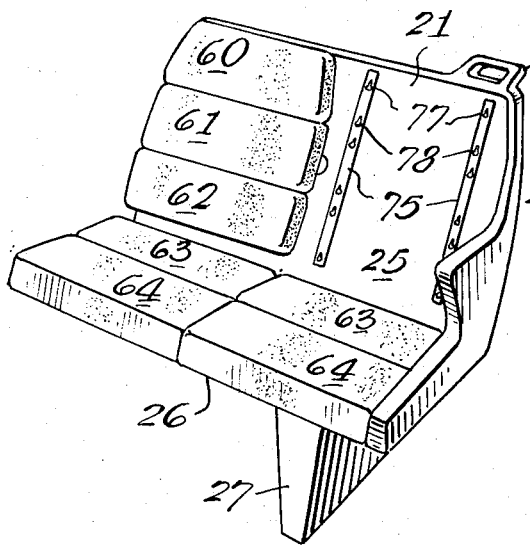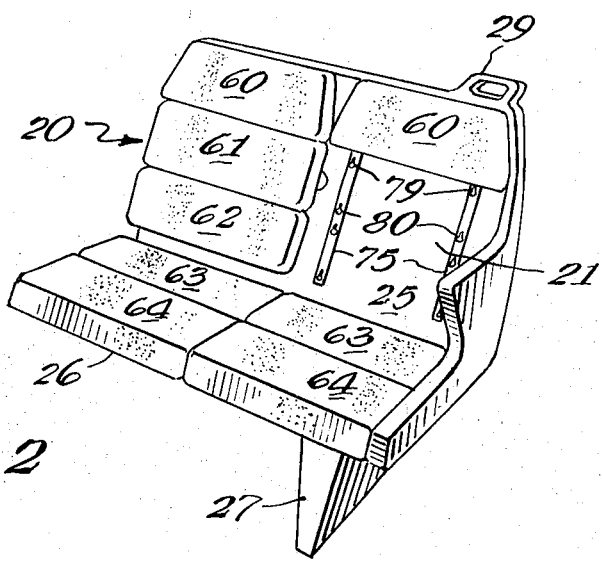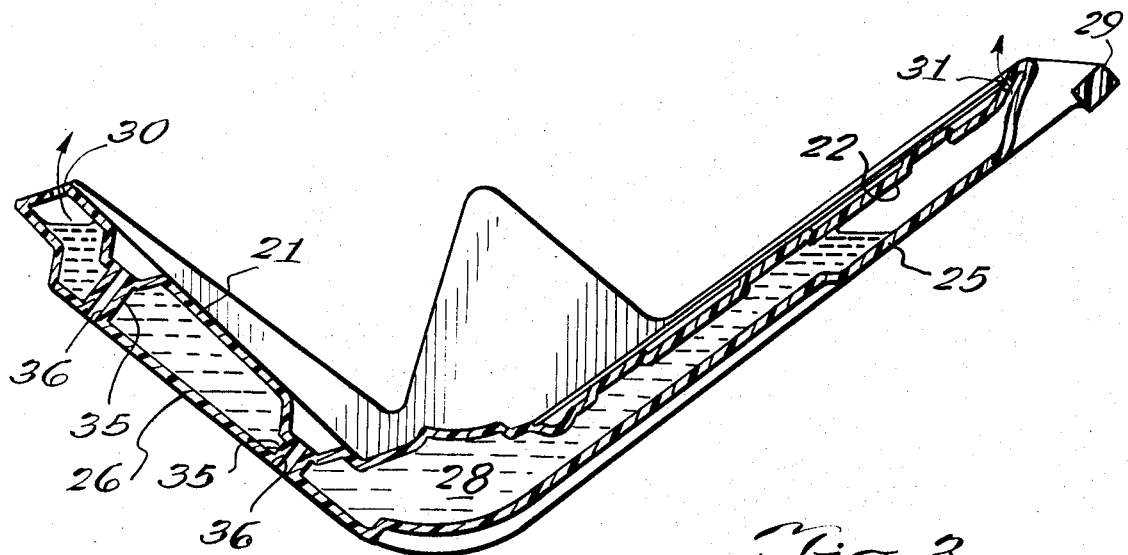

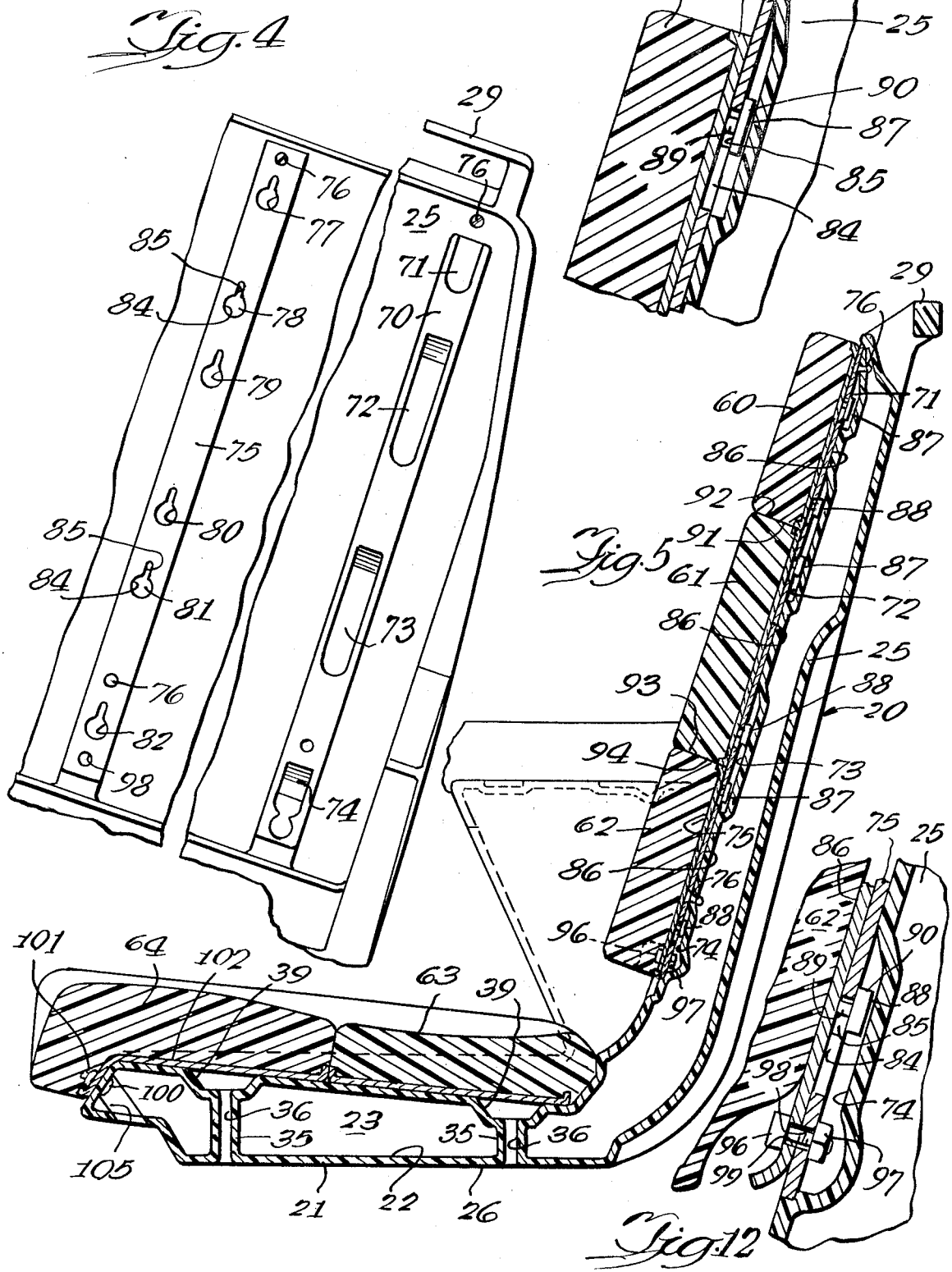

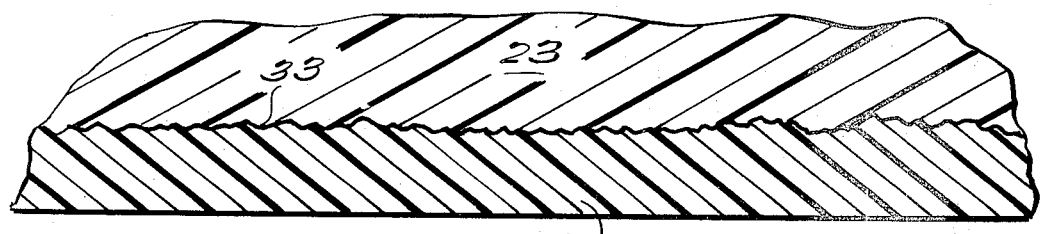
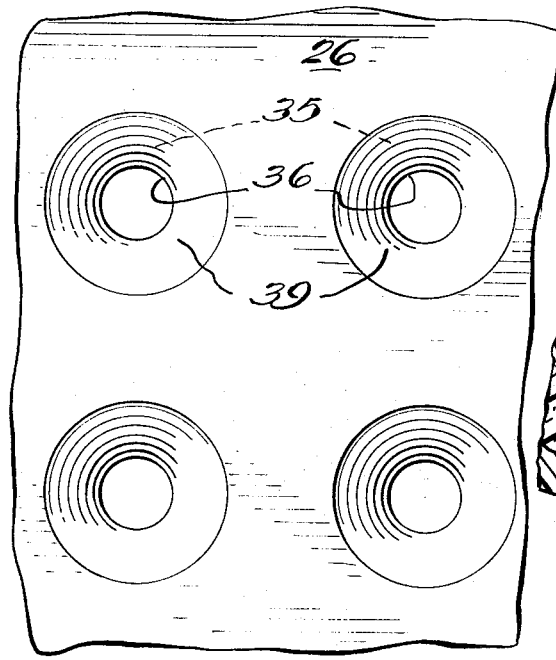
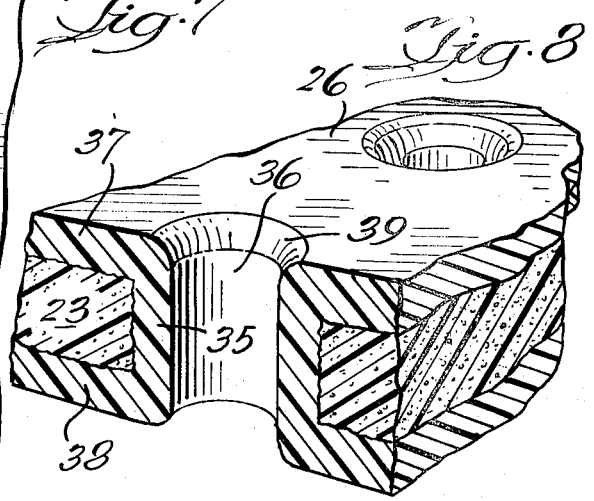
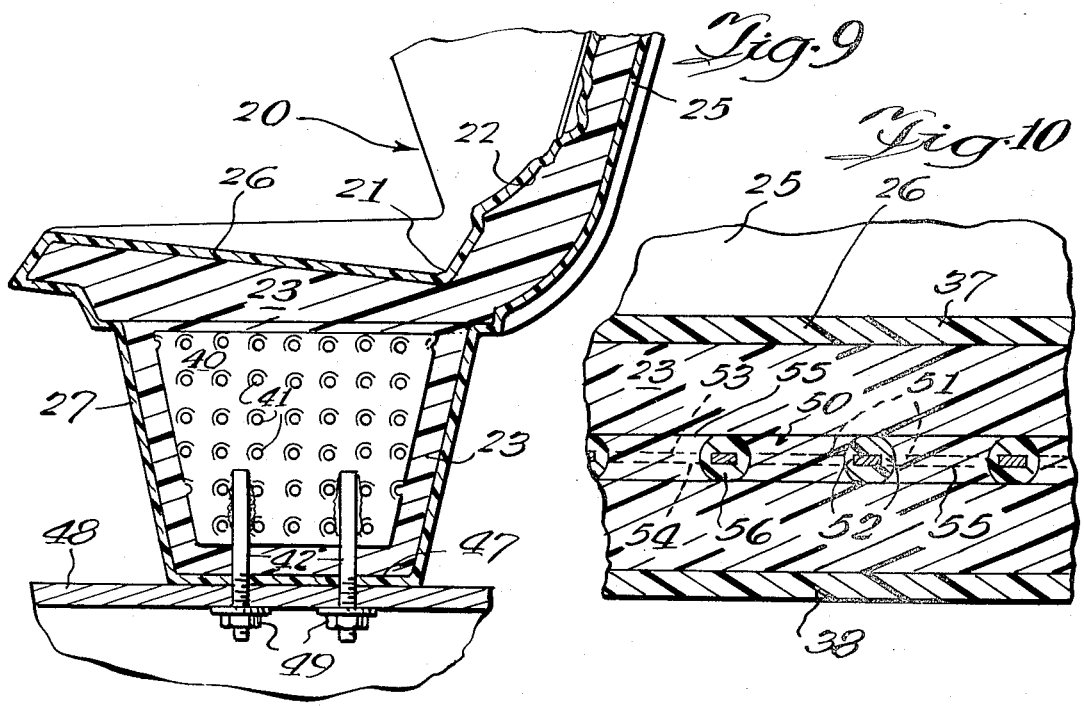

TRANSIT VEHICLE SEAT

BACKGROUND OF THE INVENTION

The present invention relates generally to seats for transit vehicles such as elevated or subway cars or buses. More specifically the invention relates to transit seats which have an aesthetically pleasing curved configuration, which are light in weight, which have increased resistance to vandalism, which are relatively economical to manufacture and which have cushion sections that are readily removable yet not readily susceptible to pilferage.

Seats used in homes, offices and elsewhere and having the aesthetically pleasing, monolithic, curved confuguration are conventionally made of moded fiberglas. It is desirable to use seats having this monolithic, curved configuration in transit vehicles. However, a typical transit vehicle has a set of several different seats; and the tooling cost, for molding a set of several such seats from fiberglas, is excessive from a manufacturer's standpoint.

SUMMARY OF THE INVENTION

In accordance with the present invention, there is provided a lightweight transit seat having the desired aesthetically pleasing, monolithic, curved configuration but which has a tooling cost as low as approximately one-seventh that for seats molded from fiberglas. The subject seat comprises a monolithic, hollow, plastic shell which is rotary cast into the desired seat shape. After rotary casting, the hollow plastic shell is completely filled with a relatively rigid, foamed plastic material. The combination of the hollow plastic shell and the rigid, foamed plastic interior impart relatively high strength and rigidity to the seat, substantially greater than that obtainable with a hollow, plastic shell along; and the combination provides a resistance to indentation from exterior blows many times greater than that of the hollow plastic shell alone, thereby contributing improved resistance to vandalism.

The shell is composed of a material which is relatively resistant to conventional chemical solvents used to remove surface markings from paint or marking pens, thus providing the shell with a tolerance to vandalism and graffiti. The shell has a color, throughout its thickness, which is the same as the exterior color on the shell, thereby minimizing the detractive appearance caused by scratches and the like.

The combination of the hollow plastic shell and the foamed plastic interior provides the seat with a relatively light weight, substantially less than the same size seat, solid throughout, composed of molded fiberglas alone. The weight saving for a transit vehicle accommodating between 30 and 40 passengers can approach approximately 1,000 pounds per vehicle. In addition, the pedestal, upon which transit seats are usually mounted, can be integrally cast as part of the seat shell, thereby contributing further weight reduction to the seat and to the vehicle in which a large number of these seats are mounted.

Another feature of the transit seat is the provision of cushion sections which are readily removable from the seat shell, for repair or replacement of the cushion sections, yet not readily susceptible to pilferage without special tools.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 1 is a perspective of an embodiment of a transit seat constructed in accordance with the present invention, with some of the cushion sections removed from the seat;

FIG. 2 is a perspective similar to FIG. 1, with an additional cushion section mounted on the seat;

FIG. 3 is a sectional view illustrating a step in the manufacture of the transit seat;

FIG. 4 is a fragmentary front view of the back portion of the transit seat, with the cushion sections removed;

FIG. 5 is a vertical sectional view of the transit seat;

FIG. 6 is an enlarged fragmentary cross section of a seat portion of the transit seat;

FIG. 7 is a fragmentary plan view of an embodiment of the seat portion of the transit seat;

FIG. 8 is a fragmentary perspective of the seat portion shown in FIG. 7;

FIG. 9 is a fragmentary sectional view illustrating a pedestal construction used in one embodiment of the transit seat;

FIG. 10 is a fragmentary sectional view along the length of an embodiment of a seat portion having a reinforcing plate therein;

FIG. 11 is an enlarged, fragmentary sectional view of the upper part of the back portion of the seat; and FIG. 12 is an enlarged, fragmentary sectional view of the lower part of the back portion.

DETAILED DESCRIPTION

Referring initially to FIGS. 1 and 5, there is illustrated generally at 20 a transit seat constructed in accordance with an embodiment of the present invention. Transit seat 20 is a standard size two passenger seat and includes a monolithic, hollow, plastic shell 21 rotary cast into the desired seat shape having an aesthetically pleasing, curved configuration. Completely filling the interior 22 of shell 21 is foamed plastic material 23 (FIG. 9).

Transit seat shell 21 includes a back portion 25 integral with a seat portion 26 which can be integral with a pedestal portion 27 (embodiment of FIG. 9). A handle 29 and a ticket-holding slot (not shown) can be integrally cast into shell 21. The shell is completely monolithic, there being no seams or joints, the shell's surface being uninterrupted and homogeneous.

Monolithic shell 21 is rotary cast either from a liquid plastic starting material or from a powdered plastic starting material, the latter being heated during rotation of the casting mold, pursuant to conventional rotary casting procedure described in greater detail below.

Hollow plastic shell 21 is typically composed of a thermosetting plastic material such as cross-linkable, thermosetting, linear polyethylene, polycarbonate, polyvinylchloride or nylon. Generally, any plastic material may be used so long as it can be rotary cast and can provide the shell with the other desirable characteristics described herein.

All portions of shell 21, including back portion 25, seat portion 26 and pedestal portion 27 are filled with foamed plastic material, typically foamed polyurethane having a density in the range 2.0 to 3.5 pounds per cubic foot. If the density is below 2.0, the strength of the resulting combination of hollow plastic shell and foamed interior is too low. At densities above 3.5, the weight and cost of the seat become excessive.

The foamed plastic material completely fills the interior of the plastic shell, there being no voids within the plastic shell unfilled with the foamed plastic material.

Shell 21 is typically manufactured utilizing a conventional rotary casting method in which powdered plastic material is introduced into a mold which is heated and rotated. The heating causes the powdered material to melt, drastically reducing the volume of the plastic material during the melting process, and the rotation of the casting mold urges the melted plastic material against the interior walls of the mold where the plastic material eventually solidifies.

After casting, shell 21 is mounted in a holding fixture (not shown) in the disposition illustrated in FIG. 3. The holding fixture maintains the shape of the shell during the time the shell's interior is filled with foamed plastic material. Foamable plastic 28, in the form of a liquid having the consistency of molasses, is introduced into the interior 22 of hollow plastic shell 21 through an opening in shell 21 (not shown); and the foamable plastic material settles at the bottom of the hollow plastic shell 21. When foamable plastic 28 foams, it rises upwardly into the back portion 25 and seat portion 26 of shell 21.

Vents 30, 31 are provided at the ends of seat portion 26 and back portion 25, respectively, these ends being the uppermost parts of seat portions 25, 26 when they are in the disposition illustrated in FIG. 3. As the foamable plastic rises in shell 21, air is forced out through vents 30, 31, thereby assuring that there are no voids left within the shell and allowing the foamed plastic material to completely fill the interior of the shell.

When filled with foamed plastic material 23, the shell has a relatively high resistance to indentation from exterior blows, many times that of unfilled shell 21 of the same thickness (e.g., ⅛ inches — ¼ inches), thereby increasing the vandal-proof character of the seat. Typically, the resistance to indentation of the filled shell is ten times that of the unfilled shell.

By utilizing the combination of a hollow plastic shell and a foamed plastic material completely filling the interior of the hollow shell, the resulting seat has the desired strength characteristics, while, at the same time, having a substantial reduction in weight compared to seats utilizing conventional constructions. For example, for a two-passenger seat, the weight reduction can be 25–30 per cent. This is because the shell would have to have relatively thick walls to provide the desired strength. A hollow shell with thin walls and an interior completely filled with foamed plastic material, as in the present invention, provides the desired strength without the thick shell walls otherwise required to obtain that strength; and this in turn substantially reduces the weight of the resulting seat.

Another factor requiring consideration is that, in a rotary casting method, the thickness of the shell walls depends upon the amount of powder which can be held in the mold at the start of the casting operation, and this depends upon the interior volume of the mold. The thicker the shell walls, the more powder required and the larger the mold. The powder occupies a relatively huge volume compared to the volume it occupies upon melting and resolidifying during rotary casting; and shell walls thick enough to provide the desired strength would require a casting mold having a huge interior volume. However, the size of the mold is limited by the dimensions of the seat shell which is to be cast, so that it may not be feasible to obtain a shell wall thick enough to provide the desired strength by itself. Utilizing a structure in accordance with the present invention permits a reduction in shell wall thickness, in the amount of powder required and in the size of the mold, all to feasible proportions.

If the shell wall is too thin, voids result during rotary casting. To eliminate voids in the shell wall, for a shell having the configuration illustrated in the drawing, the shell thickness should be at least one-eighth inch, typically in the range ⅛ inch to ¼ inch. In a typical embodiment, seat portion 26 has an average overall thickness of 1⅝ inches, with upper and lower shell walls each one-fourth inch thick and a foamed plastic interior 23 1⅛ inches thick.

There may be occasions when seat 20 is subjected to bending forces, e.g., at the front end of seat portion 26 or at the top of back portion 25. In such instances, the seat must have sufficient shear strength to resist the shearing action caused by the bending. In accordance with the present invention, structure is provided which imparts the desired shear strength to the seat.

Referring to FIG. 6, the inner surface 33 of shell 21 has a pebbled texture, comprising minute bumps and indentations. This pebbled surface texture is created by the random tumbling of the powdered plastic material during rotary casting. During the foaming operation, foamed plastic material 23 intimately surrounds the bumps and fills the indentations on pebbled inner shell surface 33. This provides an extremely good bond between the walls of hollow plastic shell 21 and the foamed plastic material 23 filling the interior of the shell, thereby improving the seat's shear resistance.

During the foaming operation, conventional blowing agents and chemicals used in that operation may initially attack shell inner surface 33 and etch it. This etching action stops after the foam has fully set; but, while it continues, the etching action has the desirable effect of roughening shell inner surface 33 thereby improving the bond between inner surface 33 and foamed plastic material 23.

Another embodiment of structure for enhancing the shear strength of the transit seat is illustrated in FIGS. 7 and 8. Extending between opposite sides 37, 38 of hollow plastic shell 21 is a hollow column 35 located within the interior of hollow plastic shell 21. Foamed plastic material 23 surrounds each column 35 which comprises structure for restricting lateral movement of the foamed plastic material within the shell. Each column 35 is hollow and has open opposite ends to define a hole 36 extending through shell 21.

FIGS. 7 and 8 illustrate columns 35 and holes 36 in seat portion 26; but columns of this nature may also be utilized in back portion 25. In seat portion 26, holes 36 may receive bolts for mounting the seat on a pedestal when the latter is not integral with the seat. Holes 36 are countersunk at 39 to accommodate the bolt heads.

Another embodiment of a strength enhancing feature is illustrated in FIGS. 9 and 10. Referring first to FIG. 10, inside seat portion 26 is a rigid, perforated plate 50 extending substantially parallel to the upper and lower walls 37, 38 of the seat portion. Perforated plate 50 has a plurality of openings 51. The upper and lower surfaces 53, 54 of plate 50 and the edges 52 of openings 51 are covered with the same plastic material, at 55, 56, as composes plastic shell 21. Foamed material 23 fills all the space in the interior of seat portion 26 not occupied by plastic-covered plate 50, including plate holes 51; and the foamed material is in intimate contact with the plastic material at 55, 56.

Plate 50 is held in place by the casting mold during the rotary casting of plastic shell 21, and is held in place by the opposed side walls of seat portion 26 (not shown in FIG. 10) during the foaming operation.

A similar reinforcing plate may be utilized in the integral pedestal portion 27 of shell 21. Referring to FIG. 9, inside pedestal portion 27 is a vertically disposed, perforated plate 40 having holes 41. Opposite surfaces of plate 40 and the edges of holes 41 are covered with the same plastic material as composes the walls of pedestal portion 27, in a manner similar to the plastic covering on perforated plate 50 illustrated in FIG. 10. As in the embodiment of FIG. 10, foamed material 23 fills all the space in pedestal portion 27 not occupied by plastic-covered plate 40, including holes 41 in the plate. The foamed material is in intimate contact with the plastic on the surfaces and hole edges of plate 40.

Welded to plate 40 are a pair of bolts 42, 42 extending through the pedestal's bottom wall 47 for attachment by nuts 49 to the floor 48 of the transit vehicle. Bolts 42 also serve to hold plate 40 in place during the casting and foaming operations.

The exterior of shell 21 need not be painted, if desired. This is because color can be blended into the plastic material from which the shell is cast, so that the color is cast into the shell throughout the thickness thereof. Shell 21 is composed of a plastic material relatively resistant to conventional chemical solvents used to remove extraneous paint or surface markings from marking pens or the like. One such material is a cross-linkable, thermosetting, linear polyethylene available from Raychem Corporation under the name "Flamolin." If the exterior of the shell is to be painted, the paint should be an epoxy paint which is resistant to solvents for conventional oil or water base paints.

The features described in the preceding paragraph permit the use of conventional solvents to remove from the exterior surface of the shell extraneous paint or markings, without detracting from the exterior appearance as would occur when extraneous paint or markings are removed from a painted exterior.

Referring to FIGS. 1, 2 and 5, mounted on back portions 25 of the transit seat are two tiers of cushion sections, each tier including an upper cushion section 60, an intermediate cushion section 61 and a lower cushion section 62. Similarly mounted on seat portion 26 of the transit seat are two rows of cushion sections, each row including a rear cushion section 63 and front cushion section 64.

All of the cushion sections 60–64 are readily removable from their respective seat portions yet are not readily susceptible to pilferage. Mounting structure for these cushion sections is illustrated in FIGS. 1–5, 11 and 12.

Molded into back portion 25 are a plurality of elongated, vertically extending depressions 70, two of the depressions 70 being provided for each of the two tiers of cushion sections 60, 61, 62. Each depression 70 includes a plurality of vertically spaced recesses 71, 72, 73 and 74 (FIG. 4). Received within each depression 70 is an elongated strip 75 held in place by conventional pop rivets 76 fastening strip 75 to back portion 25 (FIG. 5).

Referring to FIG. 4, each strip 75 contains a plurality of openings 77, 78, 79, 80, 81 and 82. Each of these openings includes a relatively wide circular portion 84 communicating with a relatively narrow neck portion 85. Strip opening 77 overlies depression recess 71. Strip openings 78, 79 overlie depression recess 72. Strip openings 80, 81 overlie depression recess 73; and strip opening 82 overlies depression recess 74.

Referring to FIGS. 5, 11 and 12, mounted on the back of each cushion section 60–64 is a plate 86; and attached to each plate 86 are a plurality of upper and lower mounting elements 87, 88. Each mounting element 87, 88 has a narrow neck portion 89 extending from plate 86 and terminating at a flat, relatively wide head portion 90. Each pair comprising an upper and lower mounting element 87, 88, is spaced apart from the other pair 87, 88 on the same cushion section a distance equal to the spacing between strips 75, 75 on seat back portion 25. The vertical distance between upper and lower mounting elements 87, 88 corresponds to the vertical distance between strip openings 77 and 78 or between strip openings 79 and 80 or between strip openings 81 and 82.

To mount a tier of cushion sections 60, 61, 62 on seat back portion 25, the upper cushion section 60 is first mounted in place in the following manner. Upper mounting elements 87, 87 are aligned with openings 77, 77 in a pair of strips 75, 75, thereby also aligning lower mounting elements 88, 88 with openings 78, 78 in the pair of strips 75, 75. Head portion 90 on each mounting element is then pushed through the wide portion 84 of the openings 77, 78, until each head portion 90 is within a respective recess 71, 72 in depression 70 on seat back portion 25. Cushion section 60 is then lifted upwardly causing the narrow neck portion 89 of each mounting element to enter the narrow neck portion 85 of openings 77, 78. In this position, the flat, wide head portion 90 of each mounting element is located behind narrow neck portion 85 of the corresponding opening 77, 78; and, because head portion 90 is wider than the opening's narrow neck portion 85, the cushion section cannot be dismounted by pulling it outwardly relative to seat back portion 25.

The procedure described above is then repeated for intermediate cushion section 61, with upper mounting elements 87 engaging strips 75 at strip openings 79 and lower mounting elements 88 engaging at strip openings 80. When intermediate cushion section 61 is pushed upwardly to prevent it from being dismounted from seat back portion 25, that cushion section's upper surface 92 engages a lower surface 91 of upper cushion section 60 to support upper cushion section 60 in its mounted position.

After mounting intermediate cushion section 61, lower cushion section 62 is similarly mounted to seat back portion 25, with upper mounting elements 87 engaging strip openings 81 and lower mounting element 88 engaging strip openings 82. When properly mounted in place, lower cushion 62 has an upper surface 93 engaging a lower surface 94 of intermediate cushion section 61, thus holding both cushion sections 61 and 60 in the positions illustrated in the drawings and preventing both cushion sections 61, 60 from slipping downwardly.

Referring to FIG. 12, lower cushion section 62 is held in place or secured by a tamper-proof fastener, such as an Allen head screw 96, which extends through an opening 99 near the bottom of plate 86 attached to the back of lower cushion section 62. Allen head screw 96 also extends through an opening 98 at the bottom of strip 75 and engages a nut 97 welded to the back of strip 75 and received in lowermost recess 74 of depression 70 on seat back portion 25. Allen head screw 96 can be engaged or disengaged with a conventional Allen wrench accommodated at screw 96 by grabbing the bottom rear portion of lower cushion section 62 and squeezing it back out of place to provide the space illustrated in FIG. 12. Cushion section 62 is composed of material sufficiently resilient to permit it to be squeezed out of the way as shown in FIG. 12. After the Allen head screw 96 is manipulated and the Allen wrench is removed, cushion section 62 can be released and it will resume the normal shape shown in FIG. 5 wherein cushion section 62 and shell 21 hide Allen head screw 96 and nut 97 from view.

When mounted as described above, cushion sections 60, 61, 62 are held in their predetermined mounted positions and the removal of any of the two upper cushion sections 60, 61 is not possible without first removing all the cushion sections below it, in the case of upper cushion section 60 this being intermediate and lower cushion sections 61, 62 while in the case of intermediate cushion section 61, this being lower cushion section 62. In no event can either the upper cushion section 60 or the intermediate cushion section 61 be removed so long as the lower cushion section 62 is secured in place by Allen head screw 96. However, once lower cushion section 62 is removed, the other two cushion sections 60, 61 are readily removable. Lower cushion section 62 is readily removable by someone having an Allen wrench of the same size as Allen head screw 96, but is not removable without this special tool, thereby enhancing resistance to pilferage. Also useable are tamper-proof fasteners other than Allen head screws, but similarly requiring special tools for removing the fastener.

Seat cushion sections 63, 64 are mounted in a manner, and with structure, similar to those used for back cushion sections 60, 61, 62 except that the mounting strips and the cushion sections are disposed horizontally rather than vertically.

In other words, seat portion 26 may be provided with elongated depressions having recesses similar to the depression 70 in back portion 75, except that the depression would extend horizontally rather than vertically. The mounting strips would have openings similar to those in mounting strip 75 on back portion 25 and would be received within the horizontally extending depressions. Mounting elements similar to 87, 88 mounted on cushion sections 60, 61, 62 would be attached to the bottom of cushion sections 63, 64 to mount the latter on the elongated strips located on seat portion 26. A fastening arrangement, similar to that utilized in attaching the lower cushion section 62 to seat back portion 25 may be utilized for securing front cushion section 64 to seat portion 26. As an alternative, front cushion section 64 is secured in its mounted position by a screw 100 engaging a nut 101 secured to the back of a plate 102 attached to the bottom of front cushion section 64 (FIG. 5). Access to screw 100 is provided by drilling a hole 105 through the shell and foamed plastic interior of seat 20. Seat cushion 64 and shell 21 hide screw 100 and nut 101 from view.

Rear cushion section 63 is held in its predetermined mounted position and cannot be moved forwardly to enable its removal from seat portion 26 unless front cushion section 64 is first removed from its mounted position.

The foregoing detailed description has been given for clearness of understanding only, and no unnecessary limitations should be understood therefrom, as modifications will be obvious to those skilled in the art.

What is claimed is:

1. A transit seat comprising:
  a rotary cast, monolithic, hollow, plastic shell without voids and composed of a thermosetting, plastic material selected from the group consisting of cross linkable linear polyethylene, polycarbonate, polyvinylchloride and nylon;
  said shell being rotary cast from powder and having a thickness in the range ⅛ inch — ¼ inch to permit rotary casting into the desired seat shape without creating voids and to permit accommodation in a rotary casting mold using powder as a starting material;
  a foamed polyurethane plastic material completely filling the interior of said shell, said interior being without voids;
  said foamed polyurethane having a density in the range 2.0 to 3.5 lbs. per cubic foot;
  said hollow plastic shell having a pebbled inner surface including bumps and indentations resulting from the rotary casting of said shell from powder;
  said foamed, polyurethane plastic material intimately surrounding said bumps and filling said indentations at said hollow surface;
  the combination of said hollow plastic shell and said foamed polyurethane interior having substantially greater strength, resistance to indentation and rigidity than said hollow plastic shell alone;
  a plurality of cushion sections;
  means removably mounting a first of said cusion sections in a first predetermined position on said shell;
  means mounting a second of said cushion sections in a second predetermined position on said shell;
  fastener means for securing said second cushion section against removal from said second predetermined position in the absence of a special tool;
  said fastener means being hidden from view by said second cushion section and said shell;
  and means on said first-recited mounting means and on the second cushion section cooperating to maintain the first cushion section in said first predetermined position and to prevent its removal therefrom so long as the second cushion section is in the second predetermined position.

2. A transit seat comprising:
  a seat member having the desired seat shape;

a plurality of cushion sections;

means removably mounting a first of said cushion sections in a first predetermined position on said member;

means mounting a second of said cushion sections in a second predetermined position on said member;

fastener means for securing said second cushion section against removal from said second predetermined position in the absence of a special tool;

said fastener means being hidden from view by said second cushion section and said seat member;

and means on said first-recited mounting means and on the second cushion section cooperating to maintain the first cushion section in said first predetermined position and to prevent its removal therefrom so long as the second cushion section is in the second predetermined position.

3. A transit seat comprising:

a rotary cast, monolithic, hollow, plastic shell composed of a thermosetting, plastic material selected from the group consisting of cross linkable linear polyethylene, polycarbonate, polyvinylchloride and nylon;

a foamed plastic material filling the interior of said shell;

a rigid plate located within the interior of said shell and extending substantially parallel to the sides of the shell portion enclosing said plate;

a plurality of holes in said plate;

the surfaces of said plate and the edges of the holes in said plate being covered with the same plastic material as composes said plastic shell;

said foamed plastic material filling all the space in said shell not occupied by said plate, including the holes in said plate;

said foamed plastic material being in intimate contact with the plastic on the surfaces and hole edges of said plate.

* * * * *